US010645853B2

(12) United States Patent
Kovach (10) Patent No.: US 10,645,853 B2
(45) Date of Patent: May 12, 2020

(54) SHANK ASSEMBLY FOR AN AGRICULTURAL IMPLEMENT WITH IMPROVED TILLAGE POINT RETENTION AND RELATED METHODS

(71) Applicant: CNH Industrial America, LLC, New Holland, PA (US)

(72) Inventor: Michael G. Kovach, Morton, IL (US)

(73) Assignee: CNH Industrial America LLC, New Holland, PA (US)

( * ) Notice: Subject to any disclaimer, the term of this patent is extended or adjusted under 35 U.S.C. 154(b) by 76 days.

(21) Appl. No.: 15/484,277

(22) Filed: Apr. 11, 2017

(65) Prior Publication Data
US 2018/0288929 A1  Oct. 11, 2018

(51) Int. Cl.
*A01B 23/02*  (2006.01)
(52) U.S. Cl.
CPC .................. *A01B 23/02* (2013.01)
(58) Field of Classification Search
CPC ....... A01B 15/02; A01B 15/06; A01B 15/025; E02F 9/2833; E02F 9/2841
USPC ......................................... 172/749, 750, 751
See application file for complete search history.

(56) References Cited

U.S. PATENT DOCUMENTS

| | | | | |
|---|---|---|---|---|
| 2,688,475 A | * | 9/1954 | Small .................. | A01B 15/025 172/762 |
| 3,085,635 A | * | 4/1963 | Livermore .......... | A01B 15/025 172/699 |
| 3,191,323 A | * | 6/1965 | Compagnoni ........ | E02F 9/2833 172/762 |
| 3,387,668 A | * | 6/1968 | Mathers ............... | A01B 15/025 172/700 |
| 3,708,019 A | | 1/1973 | Ryan | |
| 3,718,222 A | | 2/1973 | Foster | |
| 3,792,736 A | * | 2/1974 | Gondeiro ............. | A01B 15/025 172/751 |
| 3,959,901 A | * | 6/1976 | Klett .................... | E02F 9/2833 37/452 |
| 4,197,044 A | | 4/1980 | Cummings | |
| 4,730,525 A | | 3/1988 | Kelm | |
| 4,813,491 A | * | 3/1989 | Gross .................... | E02F 9/2841 172/699 |

(Continued)

FOREIGN PATENT DOCUMENTS

GB               742528         12/1955

*Primary Examiner* — Thomas B Will
*Assistant Examiner* — Joel F. Mitchell
(74) *Attorney, Agent, or Firm* — Rebecca L. Henkel; Rickard K. DeMille (57) ABSTRACT

In one aspect, a shank assembly for an agricultural implement may include a shank and a tillage point coupled to a distal end of the shank. The tillage point may include a body having first and second retention walls, with the retention walls being spaced apart such that a retention slot is defined directly between the retention walls. In addition, the first retention wall may define an inner cavity that extends from an inner surface of the first retention wall towards an opposed outer surface of the first retention wall. Moreover, the shank assembly may include a retention collar received within the inner cavity and a retention pin configured to be inserted through aligned openings of the tillage point and the shank, as well as though the retention collar, when the distal end of the shank is received within the retention slot.

17 Claims, 5 Drawing Sheets

(56) References Cited

U.S. PATENT DOCUMENTS

| | | | | |
|---|---|---|---|---|
| 4,823,486 | A | * | 4/1989 | Diekevers et al. ... E02F 9/2841 37/456 |
| 4,918,843 | A | * | 4/1990 | Kiesewetter ......... E02F 9/2841 267/141 |
| 4,932,478 | A | * | 6/1990 | Jones .................. A01B 15/025 172/699 |
| 4,974,683 | A | | 12/1990 | Hanig et al. |
| 5,009,017 | A | * | 4/1991 | Diekevers ............ E02F 9/2841 37/456 |
| 5,024,010 | A | | 6/1991 | Hulden |
| 5,044,448 | A | | 9/1991 | Lynch et al. |
| 5,172,500 | A | * | 12/1992 | Renski .................. E02F 9/2833 37/457 |
| 5,205,057 | A | * | 4/1993 | Garman ............... E02F 9/2841 37/452 |
| 5,350,022 | A | * | 9/1994 | Launder ............... A01B 15/025 172/700 |
| 5,558,165 | A | | 9/1996 | Bucher et al. |
| 5,605,196 | A | * | 2/1997 | Grimm ................. A01B 13/08 172/266 |
| 5,651,418 | A | | 7/1997 | Jerez |
| 5,927,665 | A | | 7/1999 | Grabnic |
| 6,053,675 | A | | 4/2000 | Holland et al. |
| 6,092,958 | A | * | 7/2000 | Gale .................... E02F 9/2833 37/456 |
| 6,757,995 | B2 | * | 7/2004 | Pippins ................ E02F 9/2875 172/683 |
| 6,877,259 | B2 | | 4/2005 | Nishimura et al. |
| 7,364,381 | B2 | | 4/2008 | Seib |
| 7,788,830 | B2 | * | 9/2010 | Woerman et al. .... E02F 9/2825 172/772 |
| 8,087,471 | B2 | | 1/2012 | Kovach et al. |
| 9,277,687 | B2 | | 3/2016 | Marcil et al. |
| 2016/0101509 | A1 | | 4/2016 | Nino et al. |

* cited by examiner

SHANK ASSEMBLY FOR AN AGRICULTURAL IMPLEMENT WITH IMPROVED TILLAGE POINT RETENTION AND RELATED METHODS

FIELD OF THE INVENTION

The present subject matter relates generally to agricultural implements and, more particularly, to a shank assembly with improved tillage point retention for use with an agricultural implement and related installation methods.

BACKGROUND OF THE INVENTION

A wide range of agricultural implements have been developed and are presently in use for tilling, cultivating, harvesting, and so forth. Tillage implements, for example, are commonly towed behind tractors and may cover wide swaths of ground that include various types of residue. Such residue may include materials left in the field after the crop has been harvested (e.g., stalks and stubble, leaves, and seed pods). Good management of field residue can increase efficiency of irrigation and control of erosion in the field.

Accordingly, tillers typically include ground-engaging tools, such as shanks and tillage points, configured to condition the soil for improved moisture distribution while reducing soil compaction from such sources as machine traffic, grazing cattle, and standing water. The tillage points are typically replaceable, and various different points may be coupled to the shanks, depending upon the field conditions and the desired results of the tilling operation. Currently, tillage points are mounted onto shanks simply using nuts and bolts. Unfortunately, such hardware tends to wear down over time and becomes very difficult to remove once the hexagonal shape of the nut wears away.

In the construction industry, it is known to retain bucket teeth on the bucket shank using a pin and associated lock ring, with the lock ring being installed within a counter bore defined in the bucket shank. As a result, the bucket shank must be cast or machined to include the counter bore, which significantly increases the cost of manufacturing the bucket shank. Unfortunately, existing tillage shanks for agricultural implements are not designed to include such bores. Accordingly, the retention assemblies used in the construction industry do not provide a suitable solution for desired retention of a tillage point onto an associated shank of an agricultural implement.

Accordingly, a shank assembly with improved tillage point retention for use with an agricultural implement would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a shank assembly for an agricultural implement. The shank assembly may include a shank extending lengthwise between a proximal end and a distal end, with the proximal end configured to be coupled to a portion of the agricultural implement. The shank may also define a through-hole at or adjacent to its distal end. The shank assembly may also include a tillage point coupled to the distal end of the shank. The tillage point may include a body extending lengthwise between a nose end and a retention end, with the body including a first retention wall and a second retention wall extending from the retention end of the body. The first retention wall may include a first inner surface and may define a first pin opening. The second retention wall may include a second inner surface and may define a second pin opening. The first retention wall may be spaced apart from the second retention wall such that a retention slot is defined directly between the first and second inner surfaces of the retention walls for receiving the distal end of the shank. In addition, the first retention wall may define an inner cavity in association with the first pin opening that extends from the first inner surface of the first retention wall towards an opposed outer surface of the first retention wall. Moreover, the shank assembly may include a retention collar received within the inner cavity defined by the first retention wall and a retention pin configured to be inserted through the first and second pin openings, the through-hole, and the retention collar when the distal end of the shank is received within the retention slot to couple the tillage point to the shank.

In another aspect, the present subject matter is directed to an agricultural implement including a frame and a plurality ground-engaging elements supported by the frame, with the ground engaging elements including at least one shank assembly. The shank assembly may include a shank extending lengthwise between a proximal end and a distal end, with the proximal end configured to be coupled to the frame. The shank may also define a through-hole at or adjacent to its distal end. The shank assembly may also include a tillage point coupled to the distal end of the shank. The tillage point may include a body extending lengthwise between a nose end and a retention end, with the body including a first retention wall and a second retention wall extending from the retention end of the body. The first retention wall may include a first inner surface and may define a first pin opening. The second retention wall may include a second inner surface and may define a second pin opening. The first retention wall may be spaced apart from the second retention wall such that a retention slot is defined directly between the first and second inner surfaces of the retention walls for receiving the distal end of the shank. In addition, the first retention wall may define an inner cavity in association with the first pin opening that extends from the first inner surface of the first retention wall towards an opposed outer surface of the first retention wall. Moreover, the shank assembly may include a retention collar received within the inner cavity defined by the first retention wall and a retention pin configured to be inserted through the first and second pin openings, the through-hole, and the retention collar when the distal end of the shank is received within the retention slot to couple the tillage point to the shank.

In a further aspect, the present subject matter is directed to a method for installing a tillage point onto a shank configured for use with an agricultural implement. The method may include installing a retention collar within an inner cavity defined by one of a pair of retention walls of the tillage point, with the retention walls being spaced apart from one another such that a retention slot is defined between the retention walls. The method may also include positioning a distal end of the shank within the retention slot such that the retention collar is trapped within the inner cavity between the tillage point and the shank. In addition, the method may include inserting a retention pin through aligned openings defined in the shank and the tillage point such that the retention pin is received through and is engaged by the retention collar.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a shank assembly with improved tillage point retention and related installation methods. Specifically, in several embodiments, the shank assembly may include a shank configured to be supported by the frame of an agricultural implement and a tillage point configured to be coupled to a distal end of the shank. As will be described below, the tillage point may include a pair of retention walls spaced apart from one another so as to define a retention slot for receiving the distal end of the shank. In addition, one of the retention walls may include an inner cavity defined along its inner surface for receiving a retention collar (e.g., a retaining ring, such as a snap ring). Thus, when the distal end of the shank is inserted within the retention slot defined between the retention walls of the tillage point, the retention collar may be trapped between the tillage point and the shank within the inner cavity defined by the point. A retention pin may then be inserted through aligned openings in the shank and the tillage point, as well as through the retention collar, to couple the tillage point to the shank. In such instance, when the retention pin is inserted through the retention collar, the collar may be configured to engage the pin, thereby restricting or preventing axial motion of the pin relative to the shank/point and, thus, retaining the pin within the aligned openings defined by the shank/point.

It should be appreciated that, by incorporating the retention features into the tillage point (e.g., the inner cavity and associated retention collar), new tillage points may be installed onto existing tillage shanks without requiring replacement of such existing shanks. Accordingly, the disclosed tillage point and associated retention features may be offered as a retrofit solution for current tillage shanks installed on agricultural implements.

Figure 1:
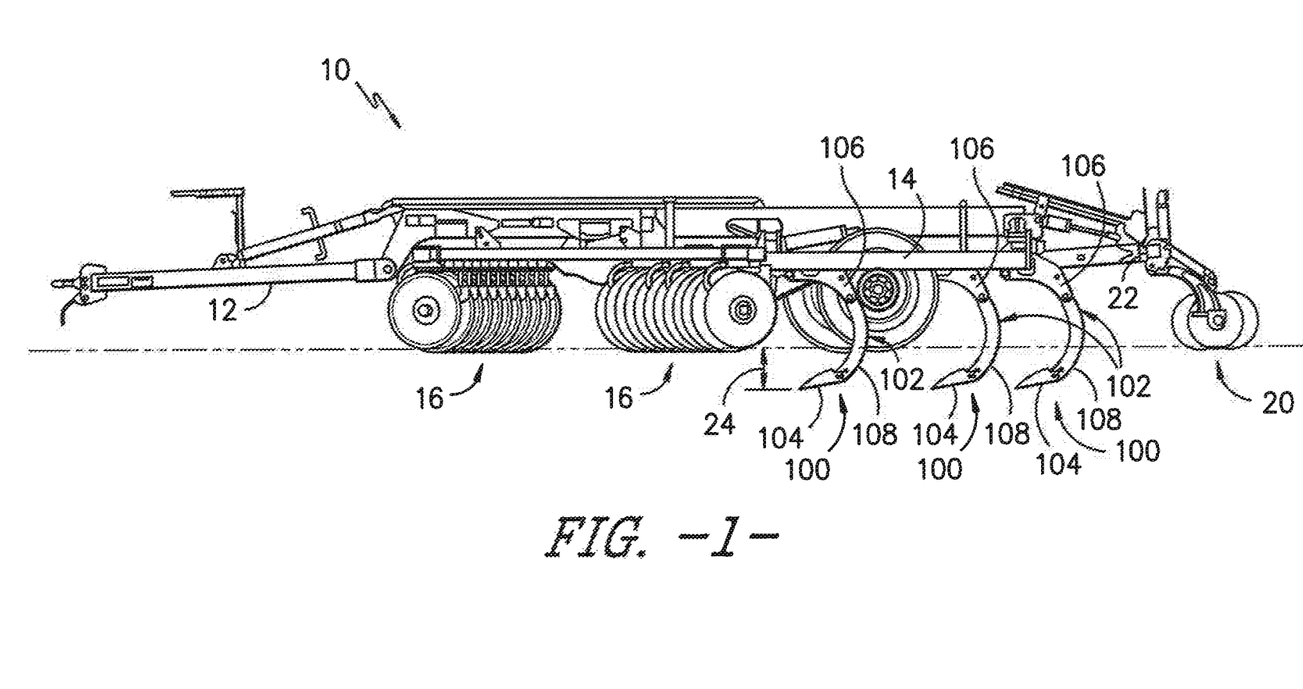
FIG. 1 illustrates a side view of one embodiment of an agricultural implement in accordance with aspects of the present subject matter.

Referring now to the drawings, FIG. 1 illustrates one embodiment of a tillage implement 10 in accordance with aspects of the present subject matter. As is generally understood, the tillage implement 10 may be used to till a field to prepare the soil by plowing, ripping, turning, and/or the like. In doing so, a portion of the soil residue, such as plant stalks and/or weeds, may be removed during the tilling process. In addition, the soil may be loosened and aerated, which in turn facilitates deeper penetration of roots. The tilling process may also help in the growth of microorganisms present in the soil and thus, maintain the fertility of the soil.

As shown in FIG. 1, the tillage implement 10 includes a tow bar 12 having a coupling mechanism, such as a hitch, used to couple the implement 10 to a towing vehicle, such as a tractor. The tillage implement 10 may also include a frame 14 and a plurality of ground-engaging tools coupled to or otherwise supported by the frame 14, such as one or more disk blades, plows, chisels, hoe openers, harrow tines, tillage points, rolling baskets, and/or the like. For instance, in the illustrated embodiment, the tillage implement 10 includes a plurality of forward disc blades 16, a plurality of shank assemblies 100, and a plurality of soil-leveling discs 20 coupled to the frame 14, with the shank assemblies 18 being located aft of the forward disc blades 16 on the frame 14 and the soil-leveling discs 20 being positioned aft of the shank assemblies 18 on the frame 14 (e.g., via an associated tool bar 22).

As shown in FIG. 1, each shank assembly 100 may include both a shank 102 coupled to the implement frame 14 at one end and a tillage point 104 coupled to the shank 102 at its opposed end. For example, each shank 102 may extend lengthwise (e.g., along an arcuate lengthwise profile) between a proximal end 108 and an opposed distal end 108, with the proximal end 106 of the shank 102 configured to be coupled to the frame 14 and the distal end 108 configured to be coupled to the tillage point 104. As is generally understood, the tillage points 104 may be configured to enable high-speed operation of the tillage implement 10 while still producing a smooth soil surface. As shown in the illustrated embodiment, the shank assemblies 100 are positioned to till a field at a depth 24, with the depth 24 of the tillage points 104 being adjustable by raising or lowering the shank assemblies 100 and/or the portions of the frame 14 relative to the field. For example, the depth 24 may be adjusted, as desired, based on local farming practices and/or field conditions.

Figure 2:
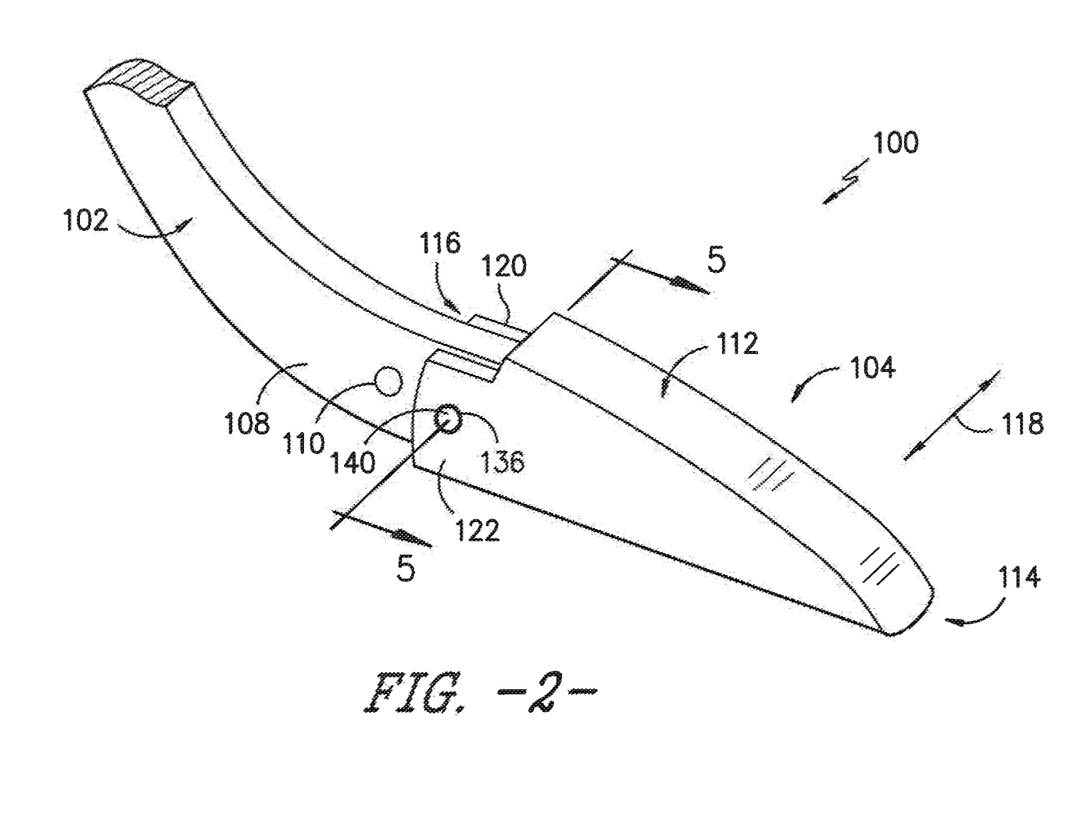
FIG. 2 illustrates a perspective, assembled view of a portion of one embodiment of a shank assembly suitable for use with an agricultural implement n accordance with aspects of the present subject matter.
Figure 3:
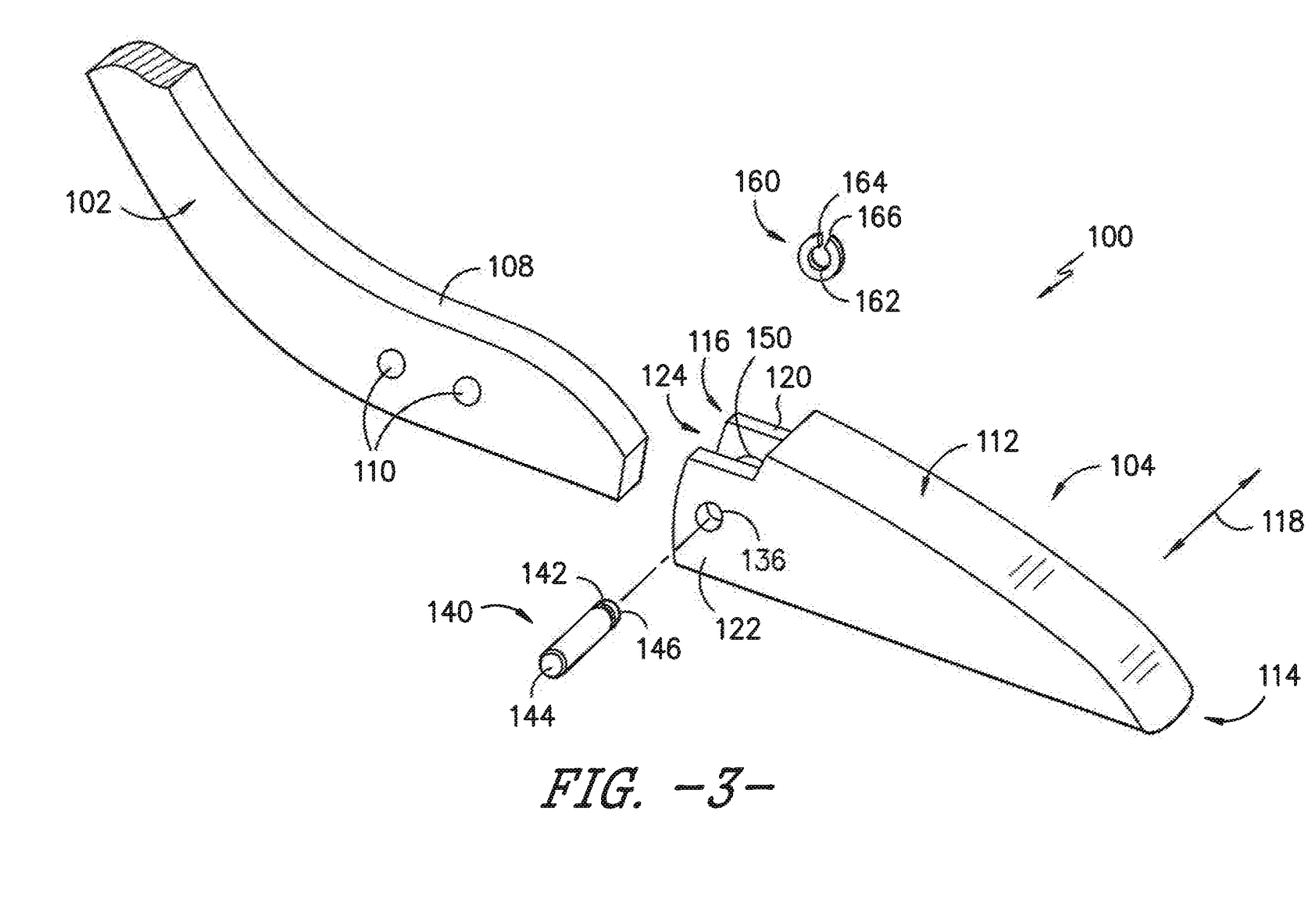
FIG. 3 illustrates a perspective, exploded view of the portion of the shank assembly shown in FIG. 2, particularly illustrating a retention pin and associated retention collar of the shank assembly for coupling the shank to the tillage point.
Figure 4:
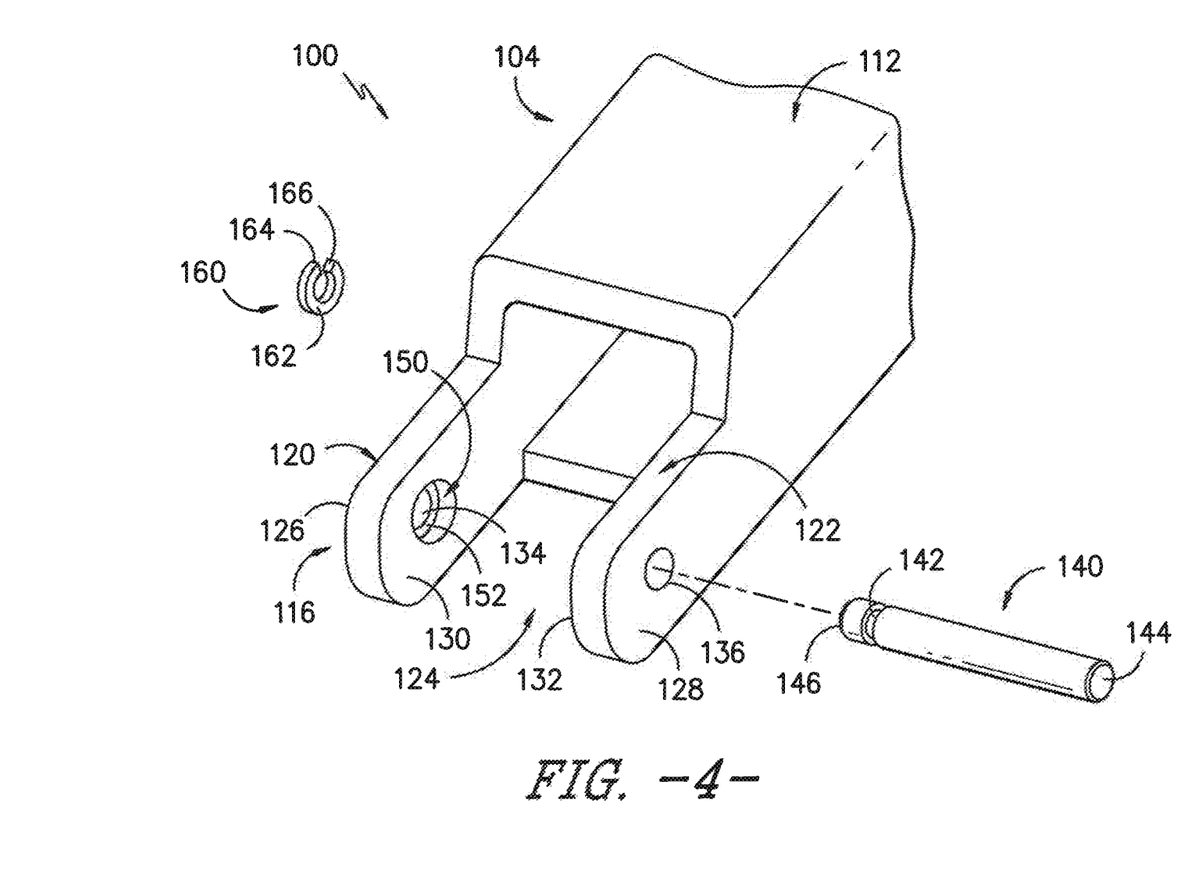
FIG. 4 illustrates a perspective view of a retention end or aft portion of the tillage point shown in FIGS. 2 and 3, particularly illustrating one of the retention walls of the tillage point defining a cylindrically shaped inner cavity along its inner surface for receiving the retention collar in accordance with aspects of the present subject matter.
Figure 5:
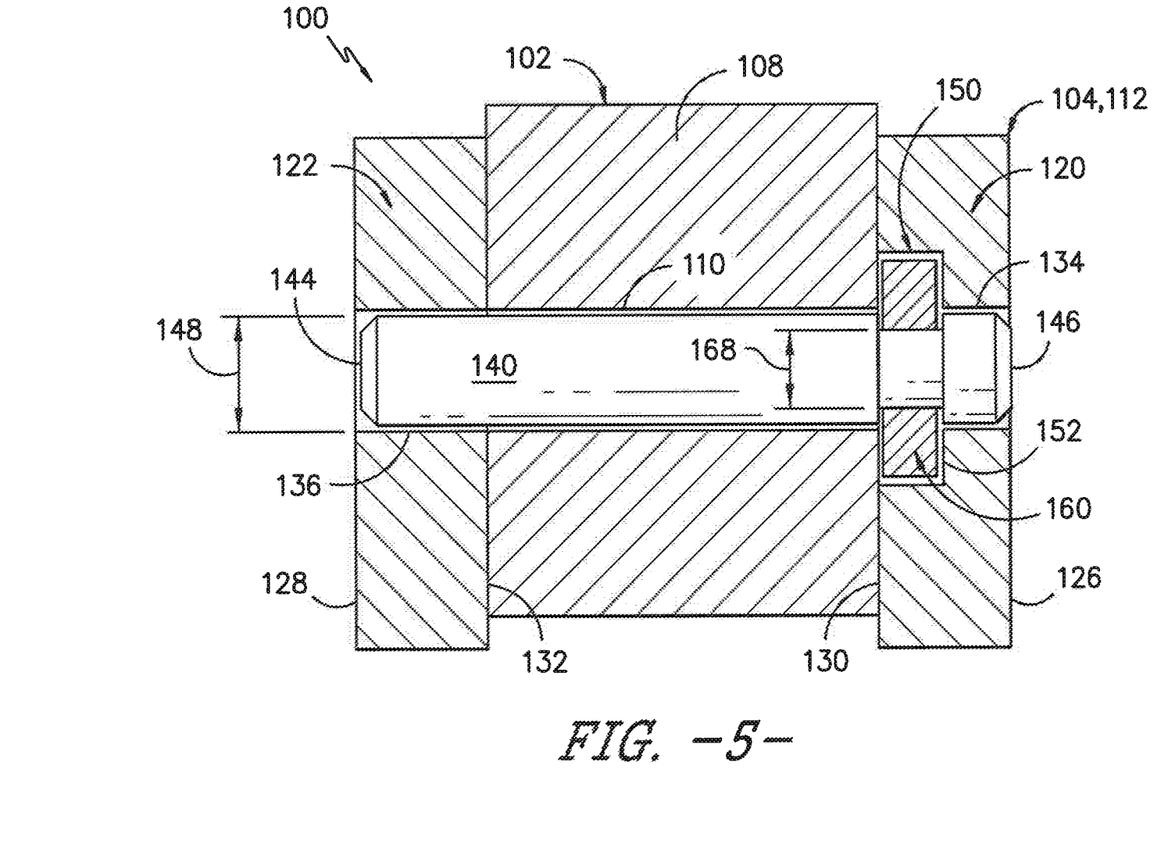
FIG. 5 illustrates a cross-sectional view of the shank assembly shown in FIG. 2 taken about line 5-5.

Referring now to FIGS. 2-5, one embodiment of a shank assembly 100 suitable for use with an agricultural implement (e.g., the tillage implement 10 shown in FIG. 1) is illustrated in accordance with aspects of the present subject matter. Specifically, FIG. 2 illustrates a perspective, assembled view of a portion of the shank assembly 100 and FIG. 3 illustrates a perspective, exploded view of the portion of the shank assembly 100 shown in FIG. 2. FIG. 4 illustrates a perspective view of an aft portion or retention end of the tillage point 104 of the shank assembly 100 shown in FIGS. 2 and 3, with various other components of the shank assembly 100 being exploded away from the tillage point 104. Additionally, FIG. 5 illustrates a cross-sectional view of the shank assembly 100 shown in FIG. 2 taken about line 5-5. It should be appreciated that, for purposes of discussion, the shank assembly 100 will be generally described with reference to the tillage implement 10 shown in FIG. 1. However, those of ordinary skill in the art will readily appreciate that the disclosed shank assemblies 100 may be utilized with any suitable agricultural implements having any other suitable implement configuration(s).

In general, the shank assembly 100 may include both a shank 102 configured to be coupled to a portion of the agricultural implement 10 and a tillage point 104 configured to be coupled to the shank 102. For instance, as indicated above, the shank 102 may extend lengthwise between a proximal end 106 (FIG. 1) and a distal end 108, with the proximal end 106 being configured to be coupled to the implement frame 14 and the distal end 108 being configured to be coupled to the tillage point 104. As particularly shown in FIG. 3, one or more through-holes 110 may be defined in the shank 102 at or adjacent to its distal end 108. As will be described below, the through-hole(s) 110 may be configured to receive a retention pin 140 for coupling the tillage point 104 to the shank 102.

Additionally, as shown in FIGS. 2 and 3, the tillage point 102 may generally include a body 112 extending lengthwise between a nose end 114 and an opposed retention end 116. In general, the nose end 114 of the tillage point 104 may be configured to enable high-speed operation of the tillage implement 10, while still producing a smooth soil surface. For instance, in one embodiment, the orientation of the nose end 114 of the body 112 may be angled downwardly with respect to a horizontal plane of movement of the tillage point 104 through the soil, which may reduce the overall amount of drag on the body 112 during operation of the implement 10. In addition, the nose end 114 of the body 112 may be substantially flat in the lateral or cross-wise direction of the body 112 (e.g., as indicated by arrow 118 in FIGS. 2 and 3), thereby further reducing drag on the body 112. However, in other embodiments, the nose end 114 of the tillage point 104 may have any other suitable configuration that allows the tillage point 104 to generally function as described herein.

Moreover, the retention end 116 of the body 112 may generally be configured to allow the distal end 108 of the shank 102 to be coupled to the tillage point 102. For instance, as shown in the illustrated embodiment, the body 112 includes first and second retention walls 120, 122 positioned at or adjacent to its retention end 116, with the retention walls 120, 122 being spaced apart from one another in the lateral direction 118 of the tillage point 104 such that a retention slot 124 (FIGS. 3 and 4) is defined between the retention walls 120, 122 for receiving the distal end 108 of the shank 102. As particularly shown in FIG. 4, each retention wall 120, 122 may include an outer surface 126, 128 extending along the exterior of the body 112 and an inner surface 130, 132 extending along an interior portion of the body 112 such that the retention slot 124 is defined directly between the opposed inner surfaces 130, 132 of the first and second retention walls 120, 122. For instance, the first retention wall 120, 122 may include a first outer surface 126 and a first inner surface 130 while the second retention wall 120 may include a second outer surface 128 and a second inner surface 132. In one embodiment, the inner surfaces 130, 132 of the retention walls 120, 122 may be configured to extend generally parallel to one another such that the slot 124 defines a uniform lateral width (not shown) between the retention walls 120, 122.

In addition, the retention walls 120, 122 may define aligned pin openings 134, 136 for receiving an associated retention pin 140 of the shank assembly 100. For instance, as shown in the illustrated embodiment, the first retention wall 120 defines a first pin opening 134 extending between its inner and outer surfaces 126, 130 and the second retention wall 122 defines a second pin opening 136 extending between its inner and outer surfaces 126, 128. In such an embodiment, when the distal end 108 of the shank 102 is received within the retention slot 124 defined between the first and second retention walls 122, 124, one of the through-hole(s) 110 defined in the shank 102 may be aligned with the pin openings 134, 136 defined in the retention walls 120, 122. The retention pin 140 may then be inserted through the aligned openings 110, 134, 136 to couple the tillage point 104 to the shank 102.

Moreover, in several embodiments, the first retention wall 120 and/or the second retention wall 122 may define an inner cavity 150 in association with its pin opening 134, 136 along the inner surface 130, 132 of such retention wall(s) 120, 122. For example, as particularly shown in FIGS. 4 and 5, the first retention wall 120 includes an cylindrically-shaped inner cavity 150 formed relative to its inner surface 130 that is concentrically aligned with the associated pin opening 134. In such an embodiment, the inner cavity 150 may be defined in the first retention wall 120 so as to extend from the inner surface 130 of the first retention wall 120 towards the opposed outer surface 126 of the first retention wall 120. Thus, as shown in FIG. 5, the inner cavity 150 may define a bore surface or shelf 152 that is recessed relative to the inner surface 130 of the first retention wall 122.

It should be appreciated that, in other embodiments, the inner cavity 150 may be defined along the inner surface 132 of the second retention wall 122 at the location of its pin opening 134. Alternatively, inner cavities 150 may be defined in both the first retention wall 120 and the second retention wall 122 along the inner surfaces 130, 132 of such walls 120, 122. It should also be appreciated that the inner cavity 150 may be formed integrally with the body 112 or may be separately machined into the body 112. For instance, in one embodiment, the body 112 of the tillage point 102 may correspond to a cast component, with the inner cavity 150 correspond to a cast feature of the body 112. Alternatively, the body 112 may be initially formed (e.g., via casting) without inner cavity 150. In such an embodiment, the inner cavity 150 may be subsequently machined into the body 112 (e.g., as a counter-bore).

It should also be appreciated that, in one embodiment, the pin openings 134, 136 and/or the cavity 150 may be slightly oversized to accommodate any misalignments and to allow for looser tolerances between the point 104 and the shank 102.

In accordance with aspects of the present subject matter, a retention collar 160 of the disclosed shank assembly 100 may be configured to be received within the inner cavity 150 defined in the first retention wall 120. For instance, as particularly shown in FIG. 5, when the retention collar 160 is received within the inner cavity 150 and the distal end 108 of the shank 102 is received within the retention slot 124 defined between the retention walls 120, 122, the retention collar 160 may be trapped within the cavity 150 between the shank 102 and the inner shelf 152 defined at the recessed end of the cavity 150.

In general, the retention collar 160 may be configured to engage the retention pin 140 at the axial location of the inner cavity 150 to prevent the pin 140 from backing out or otherwise being easily removed from the aligned openings 110, 134, 136 of the shank/point 102, 104. For example, as the retention pin 140 is being inserted through the aligned openings 110, 134, 136, the pin 140 may be received within the retention collar 160 to allow the collar 160 to engage the pin 140, thereby preventing axial movement of the pin 140 relative to the tillage point 104 and the shank 102.

In one embodiment, the retention collar 160 may correspond to a snap ring or any other suitable retaining ring. For instance, as shown in FIG. 3, the retention collar 160 may be formed from an arcuate or curved body 162 that does not form a complete circle (e.g., by extending circumferentially less than 360 degrees) such that circumferential ends 162, 164 of the body 162 are spaced apart from one another. In such an embodiment, a portion of the retention collar 160 may be configured to be received within a corresponding annular retention groove 142 defined around the outer circumference of the retention pin 140. For instance, as shown in FIG. 3, the retention pin 140 may extend lengthwise or axially between a first end 144 and a second end 146, with the recessed retention groove 142 being defined in the pin 140 between its first and second ends 144, 146 such that the retention collar 160 is engaged within the groove 142 when the pin 140 is inserted through the tillage point 104 and the shank 102. Specifically, as shown in FIG. 5, when the pin 140 is properly installed relative to the tillage point 104 and the shank 102, the retention collar 160 is axially aligned with and is at least partially received within the groove 142. As such, due to the axial engagement of the retention collar 160 with the pin 150, the retention collar 160 may serve to prevent or limit axial movement of the pin 150 within the aligned openings 110, 134, 136.

It should be appreciated that, in one embodiment, the retention collar 160 may define an inner radial dimension 168 (FIG. 5), such as an inner radius or diameter, that is smaller than the corresponding outer radial dimension 148 (FIG. 5), such as an outer radius or diameter, of the retention pin 140. As such, when the retention pin 140 is initially inserted through the retention collar 160, the collar 160 may flex radially outwardly relative to the outer surface of the pin 140 (e.g., via the ends 164, 166 of the collar 160 moving away from one another as the inner radial dimension 168 is increased) until the retention groove 142 is axially aligned with the retention collar 160, at which point the retention collar 160 may snap back radially inwardly to allow a portion of the retention collar 160 to be received within the groove 142. Such radially inward movement of the retention collar 160 relative to the pin 140 may ensure that the collar 160 remains engaged within the retention groove 142 during operation of the tillage implement 10.

As indicated above, the present subject matter is also directed to a method for installing a tillage point onto an associated tillage shank. For example, in one embodiment, the method may include installing a retention collar 160 within an inner cavity 150 defined by one of a pair of retention walls 120, 122 of a tillage point 104 and position positioning a distal end 108 of a shank 102 within a retention slot 124 defined between the retention walls 120, 122 such that the retention collar 160 is trapped within the inner cavity 150 between the tillage point 104 and the shank 102. In addition, the method may include inserting a retention pin 140 through aligned openings 110, 134, 146 defined in the shank 102 and the tillage point 104 such that the retention pin 140 is received through and engaged by the retention collar 160.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A shank assembly for an agricultural implement, the shank assembly comprising:
   a shank extending lengthwise between a proximal end and a distal end, the proximal end configured to be coupled to a portion of the agricultural implement, the shank defining a through-hole at or adjacent to its distal end;
   a tillage point coupled to the distal end of the shank, the tillage point including a body extending lengthwise between a nose end and a retention end, the body including a first retention wall and a second retention wall extending from the retention end of the body, the first retention wall including a first inner surface and defining a first pin opening, the second retention wall including a second inner surface and defining a second pin opening, the first retention wall being spaced apart from the second retention wall such that a retention slot is defined directly between the first and second inner surfaces of the first and second retention walls for receiving the distal end of the shank, the first retention wall defining an inner cavity in association with the first pin opening that extends from the first inner surface of the first retention wall towards an opposed outer surface of the first retention wall;
   a retention collar received within the inner cavity defined by the first retention wall; and
   a retention pin extending in a lengthwise direction between a first end and a second end, the retention pin defining a retention groove between the first and second ends, the retention pin configured to be inserted through the first and second pin openings, the through-hole, and the retention collar when the distal end of the shank is received within the retention slot to couple the tillage point to the shank,
   wherein the retention collar is in direct contact with the shank and a recessed shelf of the inner cavity when the distal end of the shank is received within the retention slot, and
   wherein the retention collar is positioned entirely within the retention groove in the lengthwise direction of the retention pin when the retention pin is installed through the distal end of the shank and the first and second retention walls.

2. The shank assembly of claim 1, wherein an inner radial dimension of the retention collar is less than an outer radial dimension of the retention pin such that the retention collar flexes radially outwardly when the retention pin is received within the retention collar.

3. The shank assembly of claim 2, wherein the retention collar snaps back radially inwardly when the retention collar is axially aligned with the retention groove of the retention pin.

4. The shank assembly of claim 1, wherein a side wall of the inner cavity is spaced apart from the shank along a cross-wise direction of the body of the tillage point.

5. The shank assembly of claim 1, wherein the collar is sized such that the collar is coaxial with the through-hole and the first and second pin openings when the collar is received within the inner cavity defined by the first retention wall.

6. The shank assembly of claim 1, wherein the retention collar comprises an arcuate body extending between a first circumferential end and a second circumferential end, the first circumferential end spaced apart from the second circumferential end.

7. An agricultural implement, comprising:
   a frame; and
   a plurality of ground-engaging elements supported by the frame, the plurality of ground engaging elements including at least one shank assembly, the at least one shank assembly comprising:
   a shank extending lengthwise between a proximal end and a distal end, the proximal end configured to be coupled to the frame, the shank defining a through-hole at or adjacent to its distal end;
   a tillage point coupled to the distal end of the shank, the tillage point including a body extending lengthwise between a nose end and a retention end, the body including a first retention wall and a second retention wall extending from the retention end of the body, the first retention wall including a first inner surface and defining a first pin opening, the second retention wall including a second inner surface and defining a second pin opening, the first retention wall being spaced apart from the second retention wall such that a retention slot is defined directly between the first and second inner surfaces of the first and second retention walls for receiving the distal end of the shank, the first retention wall defining an inner cavity in association with the first pin opening that extends from the first inner surface of the first retention wall towards an opposed outer surface of the first retention wall;
   a retention collar received within the inner cavity defined by the first retention wall; and
   a retention pin extending in a lengthwise direction between a first end and a second end, the retention pin defining a retention groove between the first and second ends, the retention pin configured to be inserted through the first and second pin openings, the through-hole, and the retention collar when the distal end of the shank is received within the retention slot to couple the tillage point to the shank,
   wherein the retention collar in direct contact with the shank and a recessed shelf of the inner cavity when the distal end of the shank is received within the retention slot, and
   wherein the retention collar is positioned entirely within the retention groove in the lengthwise direction of the retention pin when the retention pin is installed through the distal end of the shank and the first and second retention walls.

8. The agricultural implement of claim 7, wherein an inner radial dimension of the retention collar is less than an outer radial dimension of the retention pin such that the retention collar flexes radially outwardly when the retention pin is received within the retention collar.

9. The agricultural implement of claim 8, wherein the retention collar snaps back radially inwardly when the retention collar is axially aligned with the retention groove of the retention pin.

10. The agricultural implement of claim 7, wherein a side wall of the inner cavity is spaced apart from the shank along a cross-wise direction of the body of the tillage point.

11. The agricultural implement of claim 7, wherein the collar is sized such that the collar is coaxial with the through-hole and the first and second pin openings when the collar is received within the inner cavity defined by the first retention wall.

12. The agricultural implement of claim 7, wherein the retention collar comprises an arcuate body extending between a first circumferential end and a second circumferential end, the first circumferential end spaced apart from the second circumferential end.

13. A method for installing a tillage point onto a shank configured for use with an agricultural implement, the method comprising:
   installing a retention collar within an inner cavity defined by one of a pair of retention walls of the tillage point, the retention walls being spaced apart from one another such that a retention slot is defined between the retention walls;
   positioning a distal end of the shank within the retention slot such that the retention collar is in direct contact with the shank and a recessed shelf of the inner cavity; and
   inserting a retention pin through aligned openings defined in the shank and the tillage point such that the retention collar is positioned entirely within a retention groove defined by the retention pin in a lengthwise direction of the retention pin when the retention pin is received through and engaged by the retention collar.

14. The method of claim 13, wherein the retention collar is configured to be at least partially received within the retention groove such that the retention collar engages the retention pin and restricts axial movement of the retention pin relative to the tillage point and the shank.

15. The method of claim 13, wherein a side wall of the inner cavity is spaced apart from the shank along a cross-wise direction of the body of the tillage point.

16. The method of claim 13, wherein the collar is sized such that the collar is coaxial with the through-hole and the first and second pin openings when the collar is installed within the inner cavity defined by the first retention wall.

17. The method of claim 13, wherein the retention collar comprises an arcuate body extending between a first circumferential end and a second circumferential end, the first circumferential end spaced apart from the second circumferential end.

* * * * *